United States Patent [19]

Ganaway

[11] 4,268,784

[45] May 19, 1981

[54] CONTROL METHOD AND APPARATUS WITH RESET WINDUP PREVENTION

[75] Inventor: Franklin D. Ganaway, Bartlesville, Okla.

[73] Assignee: Phillips Petroleum Company, Bartlesville, Okla.

[21] Appl. No.: 944,483

[22] Filed: Sep. 20, 1978

Related U.S. Application Data

[63] Continuation-in-part of Ser. No. 818,036, Jul. 22, 1977, abandoned.

[51] Int. Cl.² .............................................. G05B 11/42
[52] U.S. Cl. .................................... 318/610; 364/108; 364/118
[58] Field of Search ................ 318/609, 610; 364/108, 364/118

[56] References Cited

U.S. PATENT DOCUMENTS

| | | | |
|---|---|---|---|
| 3,219,936 | 11/1965 | Eksten et al. | 318/610 |
| 3,377,547 | 4/1968 | Ohlson | 318/610 |
| 3,566,241 | 2/1971 | Ross | 318/610 |
| 3,582,629 | 6/1971 | Ross | 318/610 |
| 3,790,765 | 2/1974 | Morrison | 364/108 |
| 3,938,017 | 2/1976 | Hayes | 318/610 |
| 3,940,594 | 2/1976 | Bleak et al. | 364/118 |

Primary Examiner—Gene Z. Rubinson
Assistant Examiner—Eugene S. Indyk

[57] ABSTRACT

In a control method wherein a control signal is generated in response to the deviation of a process variable signal from a setpoint signal and the time integral over this deviation, the windup of the respective controller is prevented by automatically modifying this deviation by a signal representative of the difference between the control signal and the process control signal such as to reduce the deviation of the process variable signal from the setpoint signal by an amount representative of the difference mentioned.

20 Claims, 3 Drawing Figures

CONTROL METHOD AND APPARATUS WITH RESET WINDUP PREVENTION

This is a continuation-in-part of copending application Ser. No. 818,036, filed July 22, 1977 now abandoned.

This invention relates to control methods. More specifically, the invention relates to an anti-reset windup method by which the winding up of a controller reset or a controller having an integral portion representative of the time integral over the deviation of the process variable signal from the setpoint is avoided. In accordance with a further aspect, this invention relates to a circuit and apparatus for carrying out the control method.

BACKGROUND OF THE INVENTION

Automatic control system for the control of physical or chemical processes have been known for a long time and are further refined particularly by using digital or analog computer equipment. One control system that has considerable advantages in many applications involves so-called PI or PID controllers. These controllers generate a control signal composed of a first portion that is proportional to (P), a second portion that is the time integral of (I) and optionally a third portion that is the time derivative of (D) the deviation of a process variable signal from a setpoint.

In cases where these PI or PID controllers are used in connection with a circuitry that limits the size of the control signal or in connection with a circuitry that selects among two or more of the controllers described, the problem arises that the controller which is not actually used does not have a "feedback" through the controlled process. Therefore the integrator portion of the controller winds up until the controller has reached the maximum output signal possible. This is very undesirable because the control signal of the respective windup controller then is not representative of the desired control action anymore when the respective controller becomes active again.

THE INVENTION

It is thus one object of this invention to provide a control method in which the windup of a controller is prevented. A further object of this invention is to provide a control circuit or apparatus that does not wind up while the control is achieved by a process control signal different from the control signal generated by this control circuit.

Another object of this invention is to provide a control method and apparatus having a controller with an anti-reset windup portion that is equally useful in connection with select circuits and with limit circuits without the necessity of switching off the controller while it is not in active use.

A still further object of this invention is to provide means of preventing reset windup of a controller when the controller output is an input to a limiter circuit, to a high select circuit or to a low-select circuit.

Furthermore, it is an object of this invention to provide a control method and apparatus in which affective control of a process variable is maintained while the operation is carried out near one or more fixed or varying process constraints.

In accordance with this invention, there is now provided an improved control method wherein a control signal is generated representative of a deviation of a process variable signal from the setpoint signal and of the time integral over this deviation. The improvement in accordance with this invention consists in automatically reducing the deviation mentioned by an amount representative of the difference between an actually used process control signal and the control signal generated. In the simplest and therefore preferred case this amount is proportional to the difference, although other relationships can be used. If this difference is zero, the amount mentioned is zero also.

More specifically, the control method of the present invention comprises the following steps: A control signal representative of the deviation of a process variable signal from a setpoint signal and of the time integral over this deviation is automatically generated. In addition to the control signal a process control signal for manipulating a process parameter is automatically generated. This process control signal may be the control signal or it may be another signal. A difference signal representative of the difference between the process control signal and the control signal is automatically generated. The value of this difference signal is zero if the process control signal is the control signal. The deviation of the process variable signal from the setpoint signal is automatically reduced by an amount representative of the difference signal mentioned. This reduction of the deviation is preferably done by summing the process variable signal 180° out of phase with the difference signal. In the case when the amount by which the deviation is reduced is proportional to the difference signal, the factor by which the difference signal is multiplied or the gain given to the difference signal preferably is about equal to the gain of the process control loop in which the control signal mentioned is generated.

Summarizing, the function of the anti-reset windup circuit of this invention is to prevent the windup of a controller having reset or integrator means in the case where the controller output signal is operated on by a nonlinear function such as a magnitude signal selector or a fixed limiter. The anti-reset windup circuit provides a means of measuring the potential difference from the output of the controller to the output of the nonlinear operator, to amplify this difference signal and sum it with the controller process variable signal in such phase as to reduce the error or deviation signal to the controller. The gain of this anti-reset windup circuit which is in fact a second feedback loop is in most applications not critical but should always be at least equal to or greater than the gain of the process in which the respective controller is controlling. Preferably, the gain of the anti-reset windup circuit loop equals the gain of the corresponding process control loop. The effect of the anti-reset windup circuit is to limit further reset action of the controller when the controller output signal is no longer controlling the process.

As the process variable changes so as to reversse the sign of the "actual" controller error or deviation signal, the proportional offset across the nonlinear operator achieved by the anti-reset windup circuit is reduced to zero and the integrator portion of the controller is at the same position as when the controller output became limited or deselected by the nonlinear operator. In this control system, effective controller action therefore can be maintained while the control operation is carried out against a process constraint.

The method of this invention is particularly useful in control situations where the process control signal is generated by automatically selecting one signal as the process control signal from a group of signals comprising the control signal. Such a group of signals can consist of the control signal and at least one further control signal which is representative of the deviation of a further process variable signal from a further setpoint. This further control signal can also be the output of a PI or PID controller. The selection of the process control signal from the group of control signals can be a so-called high select or a low select mode. In case of the high select mode, the higher of two control signals or the highest of a number of control signals is selected as the process control signal whereas in the case of the low select mode the lower of the two control signals or the lowest of a number of control signals is selected as said process control signal.

In the last-mentioned case of having a plurality of control signals generated by a PI or PID controller, i.e. in cases where each one of the control signals is composed of a first portion proportional to the deviation of the respective process variable signal from the respective setpoint signal and of a second portion which is proportional to the time integral over this deviation, it is particularly advantageous and therefore preferred to modify the deviation of every controller that is not in active use by reducing the deviation by a value representative of the difference signal obtained by subtracting the process variable signal and the control signal generated by the respective controller.

In another embodiment of this invention, the process control signal is selected from a group of signals consisting of the control signal and a limit signal. This limit signal can be a lower limit or an upper limit signal. In the first-mentioned case, the process control signal will be the larger of the two signals whereas in the last-mentioned case the process control signal will be the lower of the two signals. It is also within the scope of this invention to select the process control signal from a group of signals consisting of the control signal, an upper limit and a lower limit signal with the provision that the process control signal is neither higher than the high limit signal nor lower than the low limit signal.

In the presently preferred control method of this invention, the control signal comprises a proportional component being a linear function of the deviation and additively combined therewith an integral component being a linear function of the time over the deviation. Mathematically, the relationship between the control signal cs, the process variable signal pvs and the setpoint signal sps can be expressed by the following formula:

$$cs = a(sps - pvs) + b \int (sps - pvs) dt$$

wherein a and b represent constants and wherein the time integral symbol is employed in the usual manner.

In accordance with a further embodiment of this invention, there is also provided an apparatus for generating a control signal. This apparatus comprises controller means for automatically converting an input signal into a control signal representative of the deviation of a process variable signal from a setpoint signal signal and of the time integral over this deviation. The apparatus further comprises generator means for generating a process control signal. These generator means are connected to the controller means and provide a process control signal at the output of the generator means that either is the control signal or is a process signal different from the control signal. In accordance with this invention the apparatus comprises anti-reset windup means which in turn comprise difference signal means and reduction means. The difference signal means is connected to the controller means and to the generator means and the difference signal means generates a difference signal which is representative of the difference between the process control signal and the control signal. The reduction means in turn are connected to the difference signal means and the controller means in such a manner as to reduce the deviation of the control signal from the input signal by an amount representative of the difference signal generated by the difference signal means.

More specifically and in accordance with a preferred embodiment, the generator means comprise at least two inputs and one output. One of the inputs of the generator means is connected to the controller means receiving the control signal. At least one further input is connected to a further signal source. The generator means comprises a selector adapted for automatically selecting one of the input signals and generating a process control signal corresponding to the selected input signal at the output of the generator. Among the process control signal generator means, those are presently preferred that can be characterized as belonging to the group consisting of high select modes, low select modes, high limit modes, low limit modes and high and low limit modes. The high select mode is a selector apparatus or circuit that automatically selects among the input signals that one with the highest signal value and furnishes this signal or a signal representative thereof to its output. Opposite thereto the low select mode is an apparatus or circuit that selects the input signals of the lowest value and transmits this input signal or a signal representative thereof to its output. Among those high or respectively low select circuits, those with two inputs in which the higher or the lower of the two inputs, respectively, is furnished as the output signal of the generator means or as the process control signal are presently preferred.

The high or respectively low limit mode is a process control signal generator that only has two inputs, one for receiving the control signal and one for receiving either the high limit or the low limit signal respectively. The generator means in this embodiment comprise a selector which in case of the high limit mode furnishes the control signal at the output as long as the control signal is below the high limit signal and furnishes the high limit signal at the output whenever the control signal is above the high limit signal; correspondingly, in case of the low limit mode the selector furnishes the control signal at the output as the process control signal whenever the control signal is above the low limit signal and furnishes the low limit signal as the control signal at its output whenever the control signal is below the low limit signal. The embodiment of the high and low limit mode constitutes a combination of the high limit mode and the low limit mode and thus comprises a selector circuit that furnishes the low limit signal at its output as the process control signal when the control signal is below the low limit signal, furnishes the control signal as the process control signal at its output whenever the control signal is neither below the low limit signal nor above the high limit signal and furnishes the high limit signal as the process control signal at its output whenever the control signal is above the high limit signal.

In the case of the generator being a high or low select circuit it is preferred that this generator has at least two inputs and one output. One of the inputs is connected to receive the control signal. At least one further input is connected to receive at least one further control signal which is representative of the deviation of a further process variable signal from a further setpoint signal and of the time integral over this deviation. This further control signal is provided by a further controller means. In this embodiment, anti-reset windup means are preferably provided for each controller means. Thus, at least one further anti-reset windup means is connected to the generator means and to the further controller means. The further anti-reset windup means comprises a further difference signal means and a further reduction means. The further difference signal means is connected to receive the further control signal from the further controller means and to receive the process control signal from the generator means, and to generate a difference signal representative of the difference between the process control signal and the further control signal. The further reduction means is connected to the further difference signal means and the further controller means is adapted to reduce the deviation of the further process variable signal from the further setpoint signal by an amount representative of the size of the difference signal. Most preferably, two controller means as described, each being provided with one PI controller and an anti-reset windup means are connected to the generator means.

The apparatus of this invention preferably is composed of analog circuits. The controllerss in the apparatus of this invention preferably are PI and PID controllers. The generator means described are preferably selected from the group consisting of high select circuits, low select circuits, high limit circuits, low limit circuits and high and low limit circuits.

Among the apparatus embodimentss of this invention, those in which the individual means are analog electrical circuits composed essentially of operational amplifiers are presently preferred.

The invention will yet be more fully understood from the following description of the drawing, which is intended to illustrate the preferred embodiments of this invention but not to unduly limit the scope thereof.

DETAILED DESCRIPTION OF THE INVENTION

Figure 1:
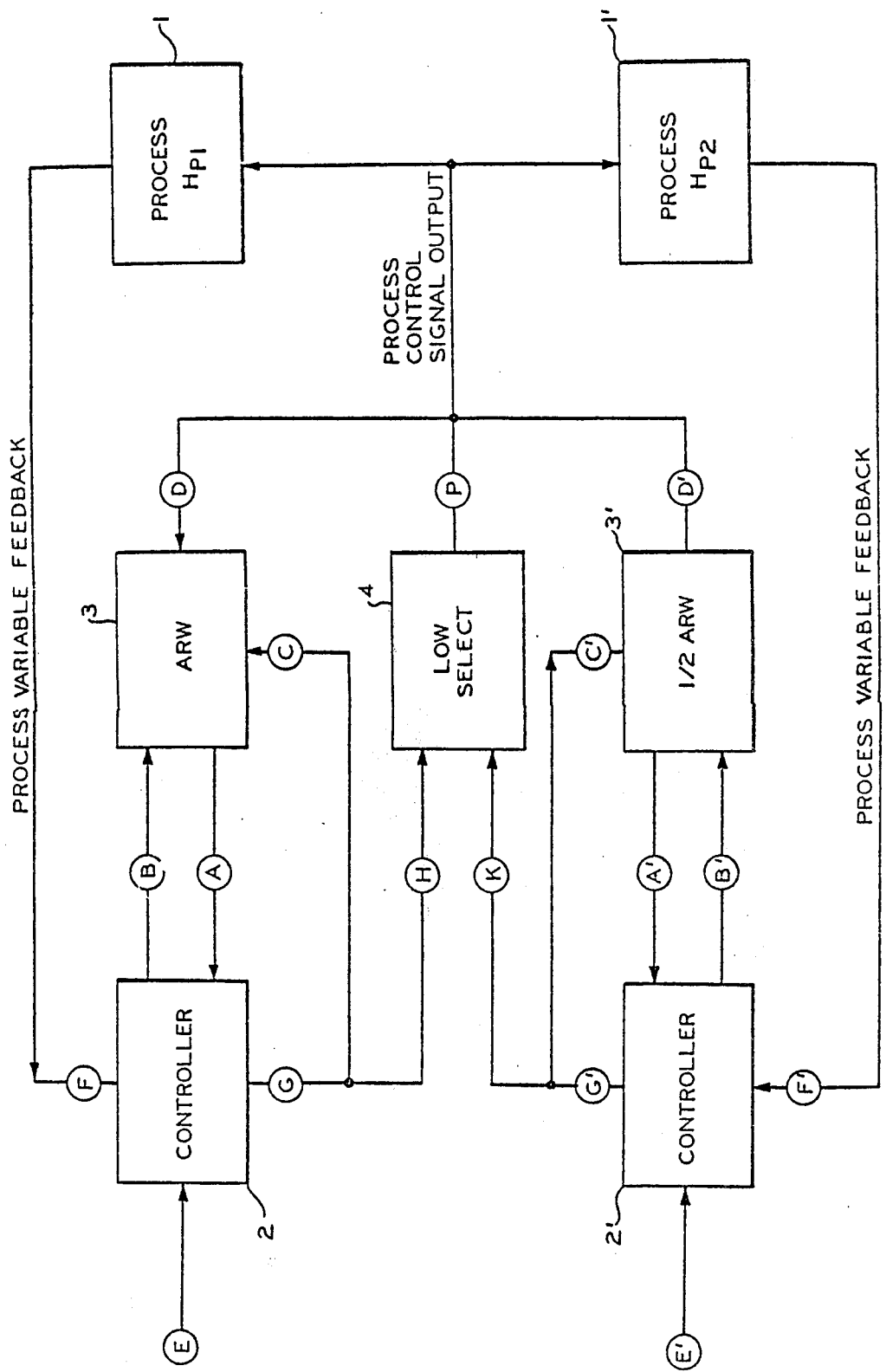
FIG. 1 shows a control system in accordance with the invention.

In FIG. 1 a control system in accordance with this invention is schematically illustrated. The process 1 and 1' show two sections of two control loops of one and the same physical or chemical process. These boxes may represent the sensing of different process variables or of the same process variable. Depending upon the control system to be described, different actions of manipulation are being taken. Thus, the process variable measured at 1 may be a temperature, the process variable measure at 1' may be a flow rate; correspondingly, the process variable that is manipulated in case of the control loop section 1 may be the heat input and in control loop section 1' may be a catalyst circulation rate. Thus whereas both control loop sections 1 and 1' relate to one and the same chemical or physical process, the control dynamics of the respective process loops can be and in most cases will be different from each other. These process dynamics for the control loop section 1 are characterized by $H_{P1}$ and for the process control loop section 1' are characterized by $H_{P2}$.

In the two control loops the different inputs and outputs of the two systems are functionally the same and differ mainly in the specific control constants. The various inputs and outputs therefore were given the same letters or numerals and the description can therefore be limited to one of the two control loops as well as the specific way of their connection.

A controller 2 which preferably is a PI or a PID lcontroller is provided with one process variable input F and a setpoint input E. The setpoint input E is in the form of a voltage from a manual or variable setpoint source. The varialbe setpoint source may be the output of a computation device. The process variable input F is an input representative of the process variable from the process control loop section 1. The controller 2 generates a control signal at the output G, which is connected to the input H of a low select circuit 4. This low select circuit 4 also receives the control signal from the second controller output G'. The low select circuit 4 selects the lower of the two control signals received at its input H and K, respectively and provides the lower of the two signals as the process control signal at its output P. This process control signal manipulates a process variable in order to bring the process variable signal at the input F or F' of the controller 2 or respectively 2' back to the setpoint value at the input E or respectively E' depending upon which one of the control signals at the outputs G or G' the low select circuit 4 has selected as the process control signal. Thus, depending upon the selection made in circuit 4, one of the control loops is closed in the sense that the control signal provided by the respective controller is the process control signal whereas the other control loop is open in the sense that the control signal provided by the respective controller is not used as the process control signal. In the open control loop, no feedback via the process itself to the controller input F or respectively F' therefore exists and the danger of winding up of the controller and more specifically of the reset or integrator portion thereof exists. In accordance with this invention, such a windup is efficiently prevented by a circuit and method as will be described in the following. Generically speaking, the reset windup prevention of the present invention starts from a switching means (in the present example of the drawing, a low select circuit 4) which selects between two signals that are very similar in size in accordance with a given logic, e.g. it selects the smaller or the larger of the two signals. The switch or selector circuit 4 also may be one that in case of all the input signals being the same size selects one of them as the process control signal in accordance with the direction or rate of change of the respective signal at a given movement. Thus, the windup prevention of the present invention is not concerned with a bumpless transfer of different controllers into and out of the respective control loop since at the point of transfer or switching or selecting the respective signals are either the same or very nearly the same size.

The reset windup prevention in accordance with this invention is done by reducing the deviation of the process variable signal from the setpoint signal in the control loops that are open. The deviation mentioned is reduced by an amount that corresponds to the difference between the respective control signal and the actually used process control signal. Therefore, the anti-reset windup unit 3 (respectively 3') receives the control signal from the output G or respectively G' at its input C or respectively C' and also receives the process control signal from the output P of the low select unit 4 at its input D or respectively D'. The anti-reset windup units 3 or 3' in the simplest case modifies either the setpoint signal or preferably the process variables signal such as to achieve the reduction of the deviation between the process variable signal and the setpoint signal as mentioned and as will be described in more detail in connection with a special circuit later.

Figure 2:
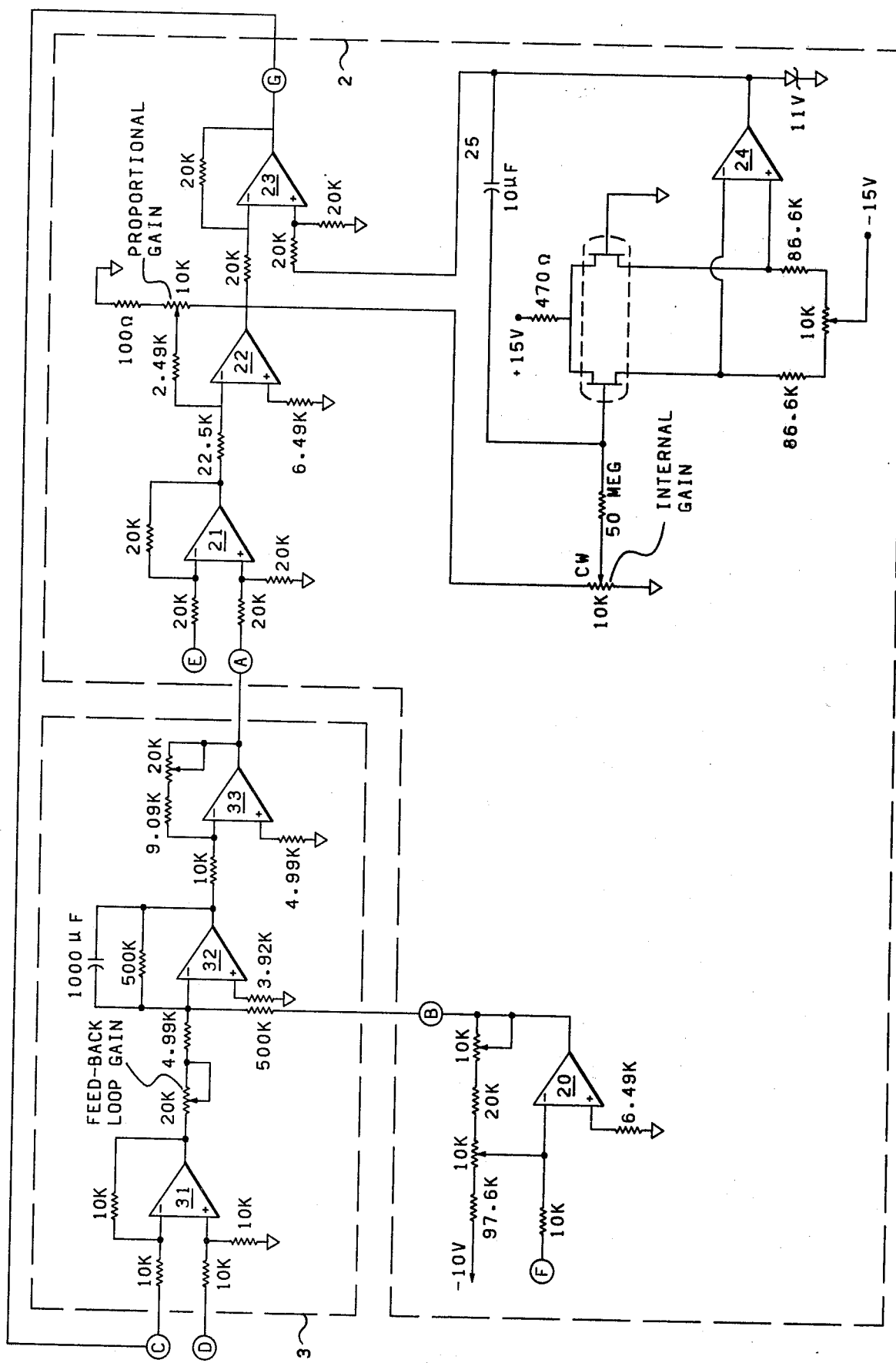
FIG. 2 shows a detailed circuit comprising the controller and the anti-reset windup circuit of FIG. 1.

FIG. 2 shows an actual circuit being an analog electrical circuit and comprising the controller 2 and the anti-reset windup circuit 3. In the specific embodiment shown in FIG. 2, a zero span circuit 20 is shown between the process variable input F and the connecting point B between the controller 2 and the anti-reset windup circuit 3. This zero span circuit comprises one operational amplifier, a constant voltage source and several resistors. The function of this zero span circuit is merely to convert a milliampere signal at the input F into a voltage signal at B. Thus, B can be thought of as the process variable signal input.

Since the details and function of operational amplifiers are well known and understood in the art, the operational amplifiers here are only shown schematically as triangles with their inverting input characterized by a minus sign and their noninverting input characterized by a plus sign. All the resistors and the capacitor are shown in their sizes in either ohms, kilohms or megohms and the capacitor is characterized in the yield weight by the capacitance in microfarad.

Figure 3:
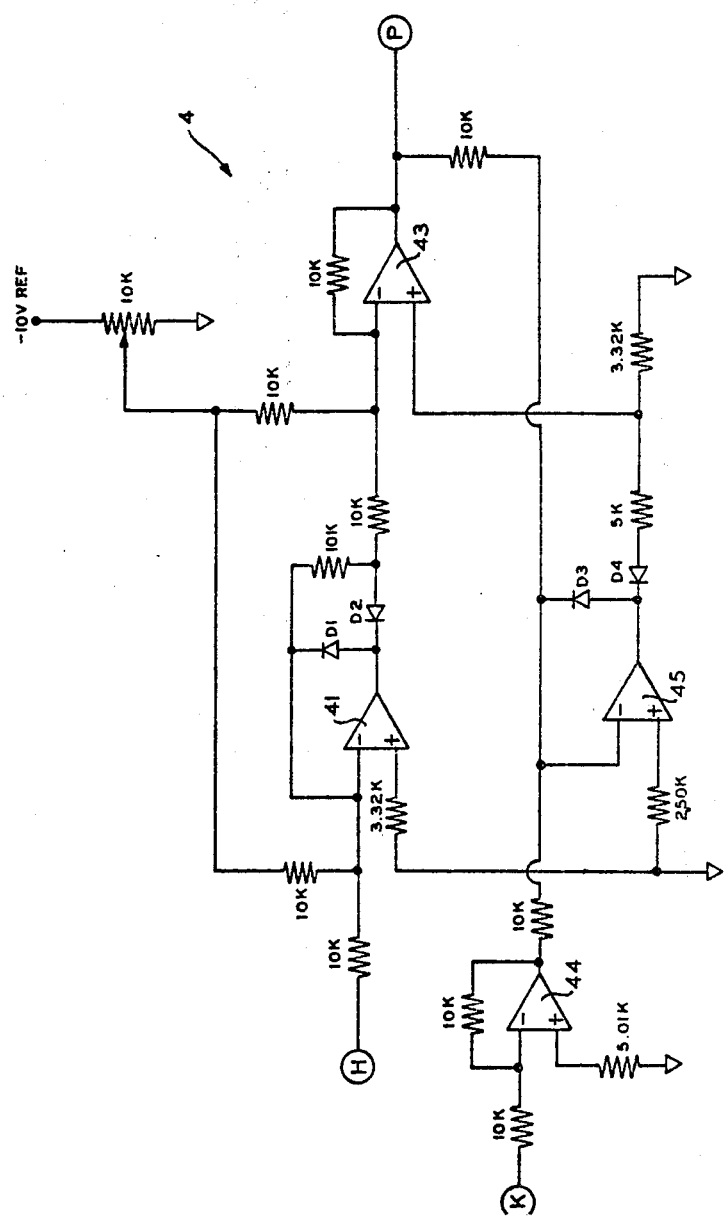

The first operational amplifier 31 of the anti-reset windup circuit receives, in the specific example, the control signal from the output G of the controller 2 via the anti-reset windup input C. Via the input D of the anit-reset windup circuit 3, this first operational amplifier 31 receives the process control signal, e.g. from a low select circuit as shown in FIG. 3. Input D, in other words, is connected to the output P of FIG. 3.

The second operational amplifier 32 of the anti-reset windup circuit receives at the inverting input thereof the signal from the output B of the zero span circuit 20 as well as the output from the first operational amplifier 31. The output of this second operational amplifier 32 therefore is corresponding to the process variable signal minus a constant factor times the difference between the process control signal at D and the control signal at C. This output of the second controller 32 of the anti-reset windup circuit is referred to in the following as the modified process variable signal. The third operational amplifier 33 of the anti-reset windup circuit essentially has the function of reversing the sign of the modified process variable signal. The output signal of this third operational amplifier 33 is connected to the operational amplifier 21 of the controller circuit 2. This operational amplifier 21 also receives the setpoint signal E. The output of the operational amplifier 21 thus corresponds to the difference between the modified process variable signal and the setpoint. The second operational amplifier 22 of the controller 2 at its inverting input receives the signal just mentioned. The output voltage at the output of the operational amplifier 22 thus corresponds to the difference between the setpoint signal and the modified process variable signal multiplied by a constant which depends upon the proportional gain selected. This deviation signal at the output of the operational amplifier 22 becomes a part of the control signal at the output G of the controller 2. The output of the operational amplifier 22 is connected to the inverting input of the operational amplifier 23. In addition to the portion that is proportional to the deviation signal, the control signal at the output G also comprises integral part. This integral part is supplied by an integrator circuit which comprises an operational amplifier 24 having its output connected via a capacitor 25 to its input. The connection is achieved via a dual field effect transistor and the size of the integral portion of the signal is determined by the adjustable integral gain. For simplicity reasons, such portions of the integrator as startup devices and switches have not been shown in the drawing. The noninverting input of the operatinal amplifier 23 receives the output of the operational amplifier 24 and the output of the operational amplifier 23 this is composed of a proportional portion which is proportional to the deviation signal and an integral portion which is proportional to the time integral over this deviation signal.

As is illustrated in FIG. 2, the output G of the controller 2 is directly related to the magnitude of the output A from the anti-reset windup circuit 3.

The output A from the anti-reset windup circuit 3 is directly related to the magnitude of the input B which is a representation of the process variable signal. Thus, a change in the process variable signal directly affects the output G of the controller 2.

If a disturbance occurs which causes a change in the process variable signal F or B then the output G of the controller 2 is increased or decreased so as to bring the process variable signal F or B back to the value of the setpoint E.

If the output G of the controller 2 is increased or decreased too quickly, in response to a change in the process variable signal F or B, the process variable signal F or B will have a tendency to oscillate about the setpoint E. The process is said to be unstable under these conditions which is highly undesirable.

In contrast, if the output G of the controller 2 is increased or decreased very slowly in response to a change in the process varialbe signal F or B, the process will be operating off specification for a longer period of time than necessary which will result in economic loss.

It is thus desirable to operate the control system of the present invention so as to prevent oscillations while still providing a fast control response to a process disturbance. This is accomplished by lagging or delaying the effect of the process variable signal only to the extent necessary to prevent oscillations and instability.

Many different circuit configurations are available which could be utilized to provide a lag or delay. In the present invention the parallel combination of the resistor and capacitor in the feedback loop of operational amplifier 32 are utilized to delay the effect of a change in the process variable signal F or B.

A lag or delay of five to fifteen minutes is considered optional for most processes. However, delays as short as a few seconds may be used if disturbances which come and go quickly are not encountered in a particular process. The optimum lag for a particular process may be determined by monitoring the process variable signal F as a process disturbance occurs. Beginning with a small lag or delay, the lag or delay may be increased until there is only limited oscillation of the process variable signal F about the setpoint E. A tradeoff may be made between response time of the control system and instability of the process if desired.

The delay may be calculated by the equation $$T = (R)(C) \tag{I}$$

where
T = delay in seconds;
R = resistance of the resistor in feedback loop of operational amplifier 32 in ohms; and
C = capacitance of the capacitor in the feedback loop of operational amplifier 32 in farads.

In the present invention the preferred size of the resistor is 500 KΩ and the preferred size of the capacitor is 1000 μf. Equation (I) gives a delay of 8.33 minutes for these values. Thus the output G from the controller 2 will not be affected by a process disturbance which causes a change in the process variable signal F for 8.33 minutes. This results in a more stable operation of a process.

The 500 KΩ resistor in the feedback loop of operational amplifier 32 and the 500 KΩ resistor between B and the operational amplifier 32 may be increased by equal amounts or decreased by equal amounts as desired. A value of 1 MΩ should not be exceeded since resistance values above 1 MΩ may cause deterioration of the amplification characteristics of operational amplifier 32.

Summarizing again, the circuit shown in FIG. 2 achieves a modification of the process variable signal furnished via input F or respectively B by an amount corresponding to the difference between the actually used process control signal supplied to the input D and the control signal generated by the controller 2 and supplied from its output G to the input of the anti-reset windup unit C. The circuitry is such that the modification of the process variable signal is accomplished to reduce the difference between the process variable signal and the setpoint signal furnished at the input E of the controller 2.

In FIG. 3 a low select circuit 4 is schematically shown. This low select circuit 4 has two inputs H and K as illustrated in FIG. 1. The input voltage from the input H is added to the reference voltage by the operational amplifier 41. The sum of the input voltage at H into the reference voltage is positive. Consequently, the output of the operational amplifier 41 is negative, the diode D2 conducts and diode D1 does not conduct. Thus the voltage at the reference point 42 is equal to the sum of the input signal H and the reference voltage (with reversed polarity, of course).

In the operational amplifier 43, the voltage at point 42 and the reference voltage are again added by means of connecting both to the inverting input of operational amplifier 43. The output of the operational amplifier 43 therefore corresponds to the input voltage at H (assuming that the diode D4 is not conducting) since the reference voltage is cancelled out by this addition and the sign of the input at the inverting input of operational amplifier 43 is reversed again. The input voltage H from the output of operational amplifier 43 and the input voltage from the second input K being reversed in operational amplifier 44 are both connected to the inverting input of operational amplifier 45. The output voltage of this operational amplifier 45 therefore is equal to the difference of the input signal from the input K and the input signal from the input H. Thus, if the signal K is larger than the signal H (both signals seem to be positive), the output of the operational amplifier 45 will be positive. Thus, the diode D3 conducts and the diode D4 does not conduct. Therefore no signal is fed back from operational amplifier 45 to the noninverting input of operational amplifier 43 and the output of the low select circuit 4 at the output P equals the smaller voltage H as furnished by the operational amplifier 43.

If the input signal of the input K is smaller than the input signal at H, the output of the operational amplifier 45 will be negative and corresponding to the difference of the input signal K minus the input signal at the input H. In this case the diode D3 does not conduct and the diode D4 will conduct furnishing the difference of these two signals to the noninverting input of operational amplifier 43. Therefore the output of the operational amplifier 43 will equal the input voltage at the input K. At the output P of the low select circuit 4, the input voltage of the input K this time appears which again is the lower of the two input voltages.

The anti-reset windup circuit and method described above in connection with a direct acting controller 2 is equally applicable to a reverse acting controller. In this case, it is only necessary to reverse the input C and D of the anti-reset windup unit.

In the following, a specific example of a control system as shown in FIG. 1 is given for a rich oil distillation column.

EXAMPLE

A rich oil distillation column in which pentane and lighter hydrocarbons are separated from the circulating oil is controlled by a processe and apparatus of this invention as described above. The first process variable determined is the pentane content in the bottom of the distillation column. This determination is done by a commercially avaiable gas chromatographic analyzer. The second process variable is the temperature in the bottom of the distillation column. This temperature is sensed by a thermocouple and a signal is generated with commercially available equipment.

The distillation column is heated by a fuel gas fired furnace. The process control signal is used to control the flow of the fuel gas into this furnace.

Under normal operating conditions, the controller associated to the pentane content in the rich oil in the bottom of the distillation column is operated to maintain the pentane concenration at the selected setpoint. This is achieved by controlling the fuel gas flow into the furnace. In the event that the temperature in the bottom of the distillation column exceeds a preselected safe operating value, the controller associated with the temperature in the bottom of the distillation column will generate a control signal that is selected by the low select circuit as the process control signal and will cause a fuel gas flow such that temperature in the bottom of the distillation column will be reduced again to a value equal to the setpoint.

The anti-reset windup circuit of this invention prevents the winding up of the deselected controller while the selected controller is in operation and has control over the flow of the fuel gas to the furnace.

Reasonable variations and modifications which will become apparent to those skilled in the art can be made in this invention without departing from the spirit and scope thereof.

I claim:
1. A control method comprising

(a) automatically generating a control signal representative of the deviation of a process variable signal from a setpoint signal and of the time integral over said deviation, (b) automatically generating a process control signal for manipulation of a process parameter, (c) automatically generating a difference signal representative of the difference between the process control signal and the control signal, (d) automatically reducing said deviation by a value representative of said difference signal.

2. A method in accordance with claim 1 wherein said process control signal is used to manipulate a process parameter so as to maintain said process variable signal generally equal to said setpoint signal.

3. A method in accordance with claim 2 wherein the effect of a change in said process variable signal on said control signal is delayed for a time T representative of the time delay necessary to generally reduce oscillations of said process variable signal about said setpoint signal.

4. A method in accordance with claim 1 wherein said process control signal is generated by automatically selecting one signal as said process control signal from a group of signals comprising said control signal.

5. A method in accordance with claim 4 wherein said group of signals comprises at least one further control signal representative of the deviation of a further process variable signal from a further setpoint signal.

6. A method in accordance with claim 5 wherein the lowest control signal of the group of signals is automatically selected as said process control signal.

7. A method in accordance with claim 5 wherein the highest of the group of signals is automatically selected as said process control signal.

8. A method in accordance with claim 4 wherein said group of signals consists of said control signal and a limit signal.

9. A method in accordance with claim 8 wherein the lower of the two signals is selected as said process control signal.

10. A method in accordance with claim 8 wherein the higher of the twwo signals is selected as said process control signal.

11. A method in accordance with claim 4 wherein said group of signals consists of said control signal, a low limit signal and a high limit signal and wherein said process control signal is automatically selected so that its value is not higher than that of the high limit signal and not lower than that of the low limit signal.

12. A method in accordance with claim 5 comprising (a) automatically generating at least one further difference signal representative of the difference between the process control signal and the respective further control signal, (b) automatically reducing the deviation of the respective further process variable signal from the respective further setpoint signal by a value representative of the respective further difference signal.

13. A method in accordance with claim 1 wherein said control signal comprises a proportional component being the linear function for said deviation and additively combined therewith an integral component being the linear function of the time integral over said deviation.

14. An apparatus for generating a control signal comprising (a) controller means for automatically converting an input signal into a control signal representative of the deviation of a process variable signal from a setpoint signal and of the time integral over this deviation (b) generator means for generating a process control signal connected to said controller means, (c) anti-reset windup means comprising (aa) difference means connected to said generator means and to said controller means for generating a difference signal representative of the difference between the process control signal and the control signal, (bb) reduction means connected to said difference signal means and to said controller means and adapted to reduce the deviation of said process variable signal from said set-point signal by a value representative of said difference signal.

15. An apparatuss in accordance with claim 14 wherein said generator means comprise at least two inputs and one output, wherein one of said inputs is connected to said controller means receiving said control signal, wherein at least one further input of said generator means is connected to a further control signal source, wherein said generator means further comprises a selector adapted for automatically selecting one of the inputs and providing the respective signal at the output as said process control signal.

16. Apparatus in accordance with claim 14 wherein said reduction means comprises:

means for combining said difference signal and said process variable signal;

means for supplying said difference signal to said means for combining said difference signal and said process variable signal;

delay means;

means for supplying said process variable signal to said delay means; and means for supplying said process variable signal from said delay means to said means for combining said difference signal and said process variable signal.

17. An apparatus in accordance with claim 14 wherein the means are composed of electrical analog circuits.

18. An apparatus in accordance with claim 17 wherein said controller means are selected from the group consisting of PI and PID controllers and wherein said generator means is selected from the group consisting of high limit circuits, low limit circuits, high limit and low limit circuits, high select circuits and low select circuits.

19. An apparatus in accordance with claim 14 wherein said further signal source is a further control means adapted for converting a further input signal into a further control signal representative of the deviation of a further process variable signal from a further setpoint signal, said further signal source being connected with the output furnishing the further control signal to said generator means being selected from the group consisting of high select and low select circuits and providing as said processs control signal at the output of said generator means a signal representative of the higher or respective lower of the control signals at the inputs of the generator means.

20. An apparatuss in accordance with claim 14 wherein said difference means comprise an operational amplifier receiving the control signal and the process control signal of the controller means or respectively the generator means at its inverting or respectively noninverting input and adapted to generate an output signal representative of the difference between the process control signal and the control signal and wherein said reduction means comprise a further operational amplifier connected with its respective input to the output of the difference signal operational amplifier as well as to a process variable signal input and wherein this operational amplifier is adapted for changing the size of the process variable signal by an amount corresponding to the output signal of the difference means and in a direction such as to reduce the deviation of the process variable signal from the respective setpoint signal and is adapted to delay said process variable signal.

* * * * *